(12) United States Patent
Wang

(10) Patent No.: US 11,522,854 B2
(45) Date of Patent: Dec. 6, 2022

(54) IOT DEVICE AND AUTHENTICATION METHOD THEREOF, CLOUD SERVER, PROCESSING DEVICE AND READABLE MEDIUM

(71) Applicant: BEIJING BAIDU NETCOM SCIENCE AND TECHNOLOGY CO., LTD., Beijing (CN)

(72) Inventor: Xuya Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 225 days.

(21) Appl. No.: 16/865,899

(22) Filed: May 4, 2020

(65) Prior Publication Data
US 2020/0358766 A1    Nov. 12, 2020

(30) Foreign Application Priority Data

May 10, 2019 (CN) .......................... 201910390414.2

(51) Int. Cl.
*H04L 9/40* (2022.01)
*H04L 9/08* (2006.01)
*H04L 9/32* (2006.01)

(52) U.S. Cl.
CPC ........ *H04L 63/0876* (2013.01); *H04L 9/0866* (2013.01); *H04L 9/3247* (2013.01); *H04L 63/083* (2013.01); *H04L 63/102* (2013.01)

(58) Field of Classification Search
CPC . H04L 63/0876; H04L 9/3247; H04L 63/083; H04L 63/102; H04L 9/0866;
(Continued)

(56) References Cited

U.S. PATENT DOCUMENTS

2009/0249069 A1    10/2009 Daskalopoulos et al.
2015/0222621 A1*   8/2015  Baum ................. H04L 63/0807
                                                        726/9

(Continued)

FOREIGN PATENT DOCUMENTS

CN     102882676 A     1/2013
CN     103517273 A     1/2014
(Continued)

OTHER PUBLICATIONS

Henderson, "Decode the Meaning Behind Your Apple Serial Number", Feb. 9, 2018 (Year: 2018).*
(Continued)

*Primary Examiner* — Michael R Vaughan
*Assistant Examiner* — Ethan V Vo
(74) *Attorney, Agent, or Firm* — Fay Sharpe LLP

(57) ABSTRACT

The present disclosure provides an authentication method of an IoT device, an IoT device, a cloud server, an IoT authentication system and a computer readable medium. The authentication method includes: calculating account information corresponding to the IoT device according to an identifier and preset attribute information of the IoT device; and sending the account information to a cloud server, to cause the cloud server to perform identity authentication on the IoT device according to the account information.

9 Claims, 6 Drawing Sheets

Account information corresponding to the IoT device is calculated according to an identifier and preset attribute information of the IoT device — S11

The account information is sent to a cloud server, to cause the cloud server to perform identity authentication on the IoT device according to the account information. — S12

(58) Field of Classification Search
CPC ....... H04L 67/12; H04L 12/2803–2838; H04L 41/0806; H04W 4/30–48; H04W 4/70; H04W 12/71
See application file for complete search history.

(56) References Cited

U.S. PATENT DOCUMENTS

| | | | |
|---|---|---|---|
| 2016/0156614 A1* | 6/2016 | Jain | H04L 63/083 726/6 |
| 2016/0285628 A1* | 9/2016 | Carrer | H04L 9/321 |
| 2017/0208432 A1* | 7/2017 | Britt | H04L 63/06 |
| 2017/0347224 A1* | 11/2017 | Robba | H04L 63/0876 |
| 2018/0054490 A1* | 2/2018 | Wadhwa | G06F 9/45558 |

FOREIGN PATENT DOCUMENTS

| | | |
|---|---|---|
| CN | 103616860 A | 3/2014 |
| CN | 103944802 A | 7/2014 |
| CN | 105812402 A | 7/2016 |
| CN | 10696835 A | 7/2017 |
| CN | 106936835 A * | 7/2017 |
| CN | 106936835 A | 7/2017 |
| CN | 108512862 A | 9/2018 |
| CN | 108574658 A | 9/2018 |
| CN | 108632231 A | 10/2018 |
| CN | 108696479 A | 10/2018 |
| CN | 108769009 A | 11/2018 |
| CN | 108900309 A | 11/2018 |
| CN | 109495445 A | 3/2019 |
| CN | 109714174 A | 5/2019 |
| JP | 2011521497 A | 7/2011 |
| JP | 2014062994 A | 4/2014 |
| JP | 2018528504 A | 9/2018 |
| JP | 2019009728 A | 1/2019 |
| JP | 2019536329 A | 12/2019 |
| KR | 20180022174 A | 3/2018 |
| KR | 20190024030 A | 3/2019 |

OTHER PUBLICATIONS

Office Action for Korean Application No. 10-2020-0052066, dated Oct. 13, 2021, 5 pages.
Office Action for Japanese Application No. 2020-082433, dated May 11, 2021, 2 pages.
Office Action for Chinese Application No. 201910390414.2, dated Feb. 20, 2021, 12 pages.

* cited by examiner

IOT DEVICE AND AUTHENTICATION METHOD THEREOF, CLOUD SERVER, PROCESSING DEVICE AND READABLE MEDIUM

CROSS-REFERENCE TO RELATED APPLICATIONS

This application is based on and claims priority to Chinese Patent Application No. 201910390414.2, filed with the State Intellectual Property Office of P. R. China on May 10, 2019, the entire contents of which are incorporated herein by reference.

TECHNICAL FIELD

Embodiments of the present disclosure relate to the field of IoT (Internet of Things) technologies, and more particularly, to an IoT device and an authentication method thereof, a cloud server, a processing device and a computer readable medium.

BACKGROUND

With the development of IoT technology and intelligentization of user needs, more and more IoT devices are connected to cloud platforms to realize scenes such as device status monitoring, historical status data storage, cloud control device instruction, and interaction between cloud control devices and devices. In order to ensure the security of the IoT system, identity authentications are required for IoT devices connected to the cloud platform.

SUMMARY

Embodiment of the present disclosure provide an authentication method for an IoT device, including: calculating account information corresponding to the IoT device according to an identifier and preset attribute information of the IoT device; and sending the account information to a cloud server, to cause the cloud server to perform identity authentication on the IoT device according to the account information.

Embodiments of the present disclosure provide an authentication method for an IoT device, including: receiving account information sent by the IoT device; and determining whether there is trusted account information matching the account information in a trusted list; determining that the IoT device passes authentication, in response to determining that there is the trusted account information matching the account information in the trusted list; and determining that the IoT device does not pass the authentication, in response to determining that there is no trusted account information matching the account information in the trusted list.

BRIEF DESCRIPTION OF THE DRAWINGS

The accompanying drawings are used to provide a further understanding of embodiments of the present disclosure, and constitute a part of the specification. The drawings are used to explain the present disclosure in combination with the embodiments of the present disclosure, and do not constitute a limitation on the present disclosure. The above and other features and advantages will become apparent to those skilled in the art by describing detailed exemplary embodiments with reference to the accompanying drawings, in which.

DETAILED DESCRIPTION

Figure 1:
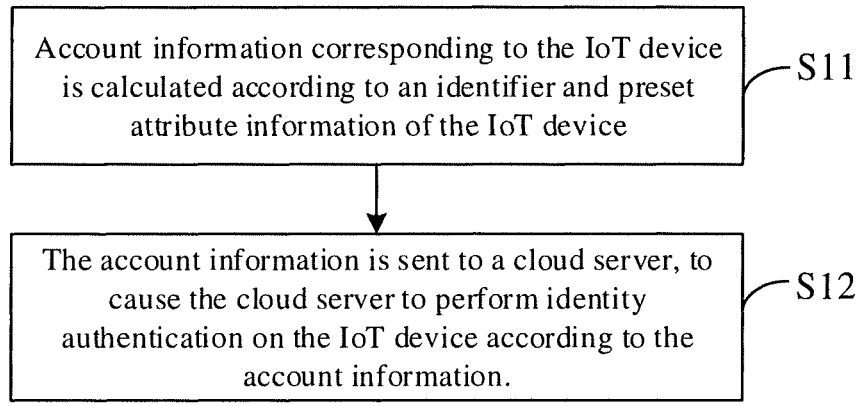
FIG. 1 is a flowchart of an authentication method for an IoT device according to some embodiments of the present disclosure.

In order to enable those skilled in the art to better understand the technical solutions of the present disclosure, an IoT device and an authentication method thereof, a cloud server, a processing device and a computer readable medium provided by the present disclosure are described in detail below with reference to the accompanying drawings.

Example embodiments will be described in detail hereinafter with reference to the accompanying drawings, but the example embodiments may be embodied in different forms and should not be construed as limiting the embodiments set forth herein. Rather, these embodiments are provided so that the present disclosure will be thorough and complete, and will enable those skilled in the art to fully understand the scope of the present disclosure.

As used herein, the term "and/or" includes any and all combinations of one or more of the associated listed items. The terms used herein are used only to describe a particular embodiment and is not intended to limit the present disclosure. As used herein, singular forms "a" and "the" are intended to include plural forms as well, unless otherwise clearly specified in the context. It will also be understood that terms "including" and/or "made of" used in this specification specify the presence of stated features, wholes, steps, operations, elements and/or components, without excluding the existence or adding one or more other features, wholes, steps, operations, elements, components, and/or groups thereof.

Embodiments herein may be described with reference to a plan view and/or a cross-sectional view with the aid of an ideal schematic diagram of the present disclosure. Accordingly, example figures may be modified according to manufacturing techniques and/or tolerances. Therefore, the embodiments are not limited to the embodiments shown in the drawings, but include modifications of a configuration formed based on a manufacturing process. Therefore, regions illustrated in the drawings have schematic attributes, and shapes of the regions illustrated in the drawings illustrate specific shapes of the regions of the elements, but are not intended to be limiting.

All terms (including technical and scientific terms) used herein have the same meaning as commonly understood by those skilled in the art, unless otherwise defined. It will also be understood that terms such as those defined in commonly used dictionaries should be interpreted to have meanings consistent with their meanings in the context of the related technology and the present disclosure, and will not be interpreted as having idealized or excessive formal meanings, unless explicitly defined as such.

FIG. 1 is a flowchart of an authentication method for an IoT device according to some embodiments of the present disclosure. As shown in FIG. 1, the authentication method may be implemented by the IoT device. In detail, the authentication method may include the following acts.

At block S11, account information corresponding to the IoT device is calculated according to an identifier of the IoT device and preset attribute information of the IoT device.

The IoT device may store a software development kit (SDK) pre-programmed by the device manufacturer. The SDK includes the attribute information of the IoT device and rules for calculating the account information based on the identifier and the attribute information of the IoT device. Block S11 may be executed by the IoT device through calling the SDK.

The attribute information of the IoT device may include information configured to characterize the type of the device. For example, the attribute information may be the category or type of the IoT device, or the attribute information may include the information and category of the manufacturer corresponding to the IoT device.

In some embodiments, the attribute information of the IoT device includes the manufacturer information corresponding to the IoT device and the category/type of the IoT device. The manufacturer information may include information configured to characterize the manufacturer, such as the manufacturer name, the manufacturer code, and the like. The category of the IoT device may include information such as the name or the model of the IoT device. The attribute information of the same type of IoT device is the same, and the attribute information may be burned in the IoT device in advance. The identifier of the IoT device may be the serial number that comes with the IoT device, such as the mac address of the IoT device.

In some embodiments, the account information is login information when logging into the cloud server, in some embodiments, the account information may include the username and the password.

Figure 2:
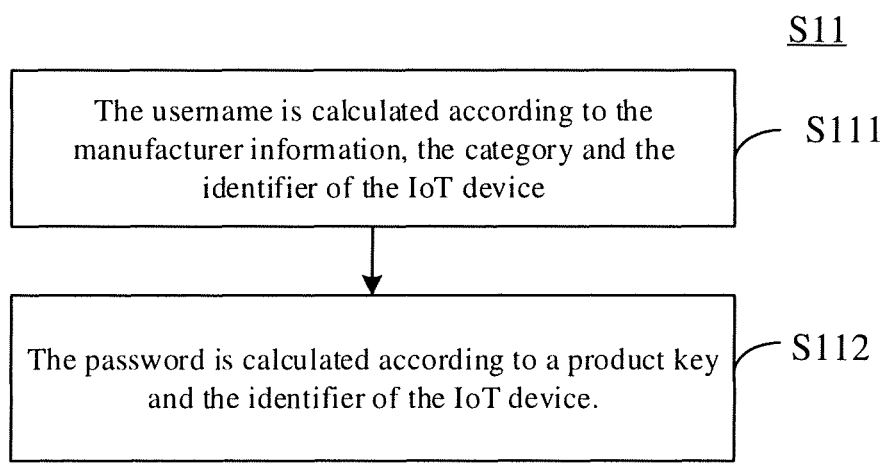
FIG. 2 is a flowchart of an implementation manner of block S11 according to some embodiments of the present disclosure.

FIG. 2 is a flowchart of an implementation manner of block S11 according to some embodiments of the present disclosure. As shown in FIG. 2, in some embodiments, block S11 may include the following acts.

At block S111, the username is calculated according to manufacturer information, the category and identifier corresponding to the IoT device.

The manners for calculating the username are not limited here. For example, the username may be obtained by sequentially combining character strings of the manufacturer information, the category and the identifier corresponding to the IoT device. For example, the manufacturer information is "Beijing AAA Co., Ltd.", the category is "XX-type device", and the identifier of the IoT device is "01234", then the username may be "Beijing AAA Co., Ltd. XX-type device 01234".

At block S112, the password is calculated according to a product key and the identifier of the IoT device.

The product key includes a key of the IoT devices of the same category, and is calculated according to the manufacturer information and the category corresponding to the IoT device. The calculation method of the product key is not limited herein. For example, a method of intercepting and splicing may be adopted. In addition, in some embodiments, the product key may be calculated by the IoT device.

Figure 3:
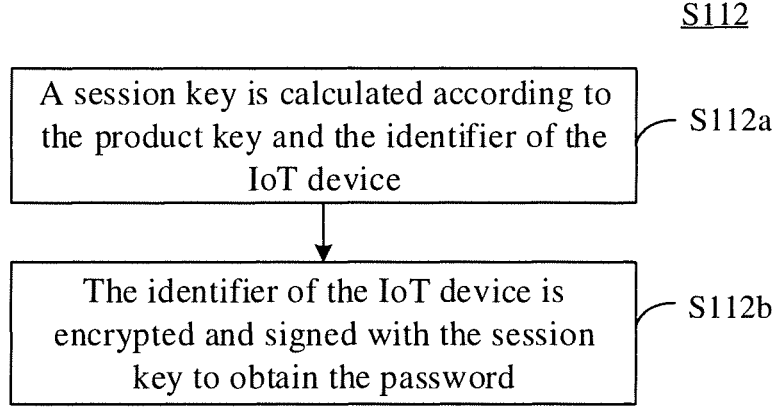
FIG. 3 is a flowchart of an implementation manner of block S112 according to some embodiments of the present disclosure.

FIG. 3 is a flowchart of an implementation manner of block S112 according to some embodiments of the present disclosure. As shown in FIG. 3, in some embodiments, block S112 may include the following acts.

At block S112a, a session key is calculated according to the product key and the identifier of the IoT device.

The session key is configured to encrypt the identifier of the IoT device, and generate the product key and the identifier of the IoT device through a decentralized method.

At block S112b, the identifier of the IoT device is encrypted and signed with the session key to obtain the password.

The session key may be used for signing.

In other embodiments of the present disclosure, the attribute information of the IoT device may include the manufacturer information, the category and the product key corresponding to the IoT device. The product key may be calculated by the cloud server according to the manufacturer information and the category corresponding to the IoT device.

In some embodiments, before the SDK is burned to the IoT device, the manufacturer of the IoT device may register on the cloud server, and fill in the manufacturer information and the category of the IoT device, such that the cloud server can generate the product key based on the manufacturer information and the category. The product key may be written into the SDK together with the manufacturer information of the IoT device, the category corresponding to the IoT device and the rules for calculating the account information.

In this case, block S11 also includes the above blocks S111 and S112, which will not be repeated here. Since the product key is burned into the IoT device in advance, the efficiency for the IoT device to calculate the account information can be improved.

At block S12, the account information is sent to a cloud server, to cause the cloud server to perform identity authentication on the IoT device according to the account information.

The account information may be sent to the cloud server by wireless transmission. Before the cloud server performs identity authentication on the IoT device, the cloud server may obtain identifiers and attribute information of multiple IoT devices reported by the IoT device manufacturer in advance, and calculate multiple pieces of trusted account information by using the same calculation rules as the calculation rule in the SDK, and compare the account information received with each piece of trusted account information to determine whether the IoT device passes authentication.

Generally, the same account information may be burned the IoT devices produced in the same batch, and these IoT devices use the same account information to log into the cloud server, once the account information for an IoT device is hacked, other IoT devices will also be hacked, the security of the IoT system is poor.

In the present disclosure, the account information for the IoT device to log into the cloud server is calculated based on the identifier and the preset attribute information of the IoT device, and different identifiers of the IoT devices correspond to different account information, when the identifiers of the IoT devices are different, the account information are also different. Even when the account information of a certain IoT device is hacked, other IoT devices will not be affected, thereby improving the security of the IoT system. In addition, the manufacturer of the IoT device may burn calculation rules of account information and attribute information of the IoT device into the same batch of IoT devices, such that the workload of the production line will not be increased.

Figure 4:
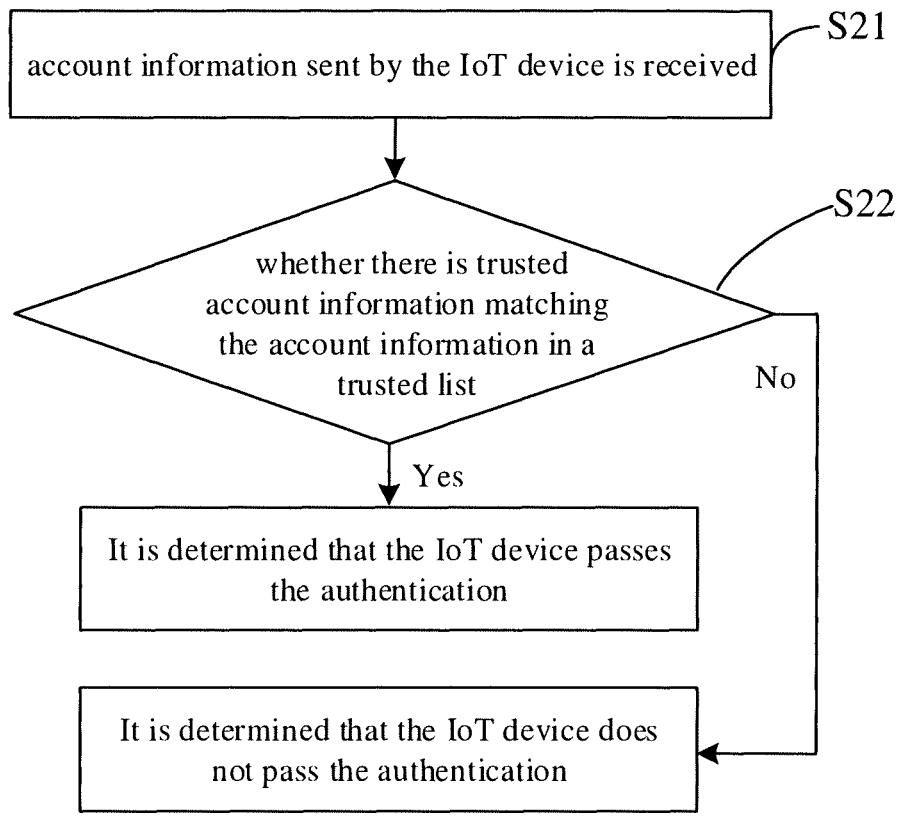
FIG. 4 is a flowchart of an authentication method for an IoT device according to some embodiments of the present disclosure.

FIG. 4 is a flowchart of an authentication method for an IoT device according to some embodiments of the present disclosure. As shown in FIG. 4, the authentication method may be executed by the cloud server. The authentication method includes the following acts.

At block S21, the account information sent by the IoT device is received.

The account information is calculated by the IoT device according to the identifier and the preset attribute information of the IoT device. The account information includes the username and the password.

At block S22, it is determined whether there is trusted account information matching the account information in a trusted list. In response to determining that there is the trusted account information matching the account information in the trusted list, it is determined that the IoT device passes the authentication; and in response to determining that there is no trusted account information matching the account information in the trusted list, it is determined that the IoT device does not pass the authentication.

Each trusted account information in the trusted list is calculated according to the identifier and the attribute information of the IoT device reported by the manufacturer of the IoT device. Each trusted account information includes a trusted username and a trusted password. The trusted account information matching the account information may refer to that the trusted username is the same as the username sent by the IoT device, and the trusted password is the same as the password sent by the IoT device.

In some embodiments, the attribute information of the IoT device reported by the manufacturer of the IoT device includes the manufacturer information corresponding to the IoT device and the category of the IoT device.

The manufacturer information reported by the manufacturer of the IoT device is the same type of information, for example, the name of the manufacturer, as the manufacturer information recorded in the IoT device. The category or the type of the IoT device reported by the manufacturer of the IoT device is the same type of information, for example, the product name, as the category recorded in the IoT device.

In practical applications, before the SDK is burned to the IoT device, the manufacturer of the IoT device may register on the cloud server, fill in the manufacturer information and product information, and upload a white list corresponding to each category of devices. The white list records the identifier of the same category of IoT devices, such that the cloud server calculates and obtains each trusted account information.

Figure 5:
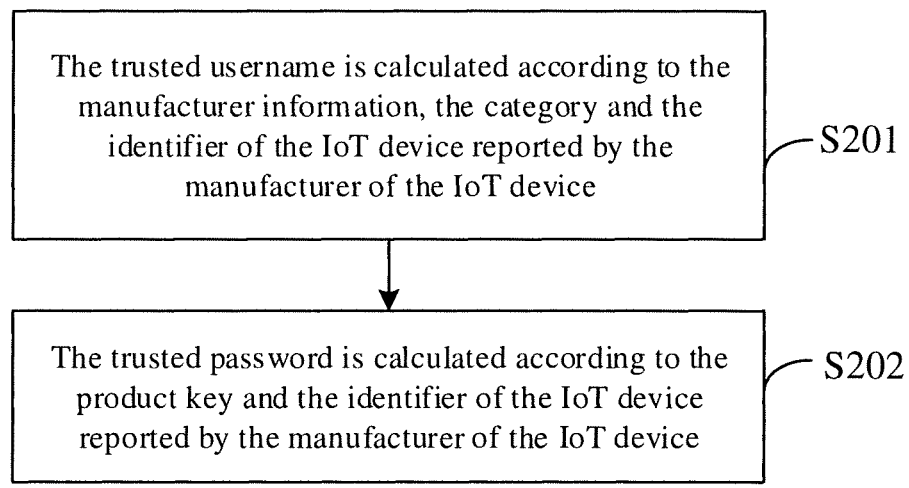
FIG. 5 is a flowchart of an implementation manner for calculating trusted account information according to some embodiments of the present disclosure.

The calculation rule of the trusted account information is the same as the calculation rules of the account information at block S11 in the foregoing embodiments. FIG. 5 is a flowchart of an implementation manner for calculating trusted account information according to some embodiments of the present disclosure. As shown in FIG. 5, the trusted account information may be obtained through the following acts.

At block S201, the trusted username is calculated according to the manufacturer information of the IoT device, the category corresponding to the IoT device and the identifier of the IoT device reported by the manufacturer of the IoT device.

The calculation rule for calculating the trusted username are the same as the calculation rule for calculating the username of the IoT device at block S11.

At block S202, the trusted password is calculated according to the product key and the identifier of the IoT device reported by the manufacturer of the IoT device.

The product key is calculated according to the identifier and the category corresponding to the IoT device reported by the manufacturer of the IoT device. As described above, in some embodiments, the attribute information of the IoT device may include the manufacturer information and the category corresponding to the IoT device, and the product key is calculated by the IoT device. In this case, the c rule in the cloud server for calculating the product key are the same as the calculation rule for the IoT device to calculate the product key.

Figure 6:
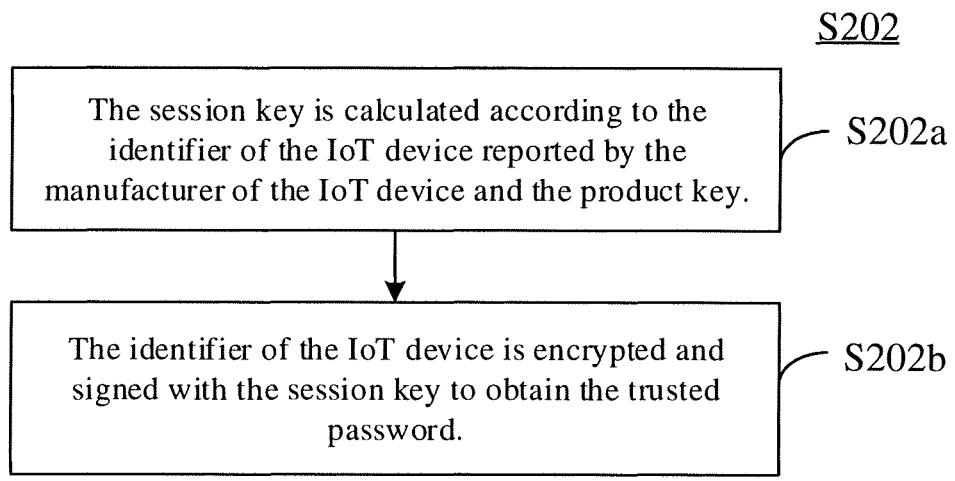
FIG. 6 is a flowchart of an implementation manner of block S202 according to some embodiments of the present disclosure.

FIG. 6 is a flowchart of an implementation manner of block S202 according to some embodiments of the present disclosure. As shown in FIG. 6, in some implementations, block S202 may include the following acts.

At block S202a, the session key is calculated according to the identifier of the IoT device reported by the manufacturer of the IoT device and the product key.

The calculation rule of the session key may be the same as the calculation rule for the IoT device to calculate the session key at block S112a. For example, the product key and the identifier of the IoT device may be generated through a decentralized method.

At block S202b, the identifier of the IoT device is encrypted and signed with the session key to obtain the trusted password.

The encryption method and signature method at block S202b may correspond to the encryption method and signature method of the IoT device at block S112b.

In the present disclosure, the account information for the IoT device to log into the cloud server corresponds to the identifier and attribute information of the IoT device. Different identifiers or attribute information of the IoT devices correspond to different account information. The cloud server may generate the trusted list in advance, and compare the account information received with each trusted account information in the trusted list to determine whether the IoT device passes the authentication. Even when the account information of an IoT device is hacked, other IoT devices will not be affected, thereby improving the security of the IoT system.

Figure 7:
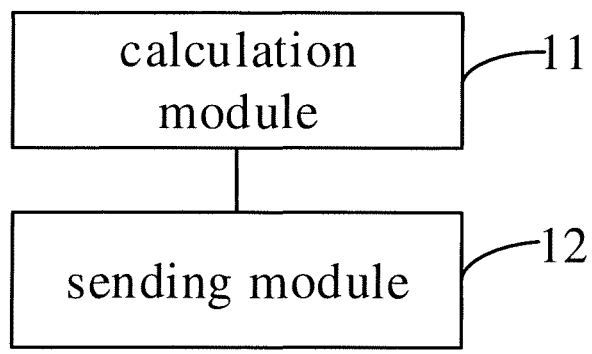
FIG. 7 is a block diagram of an IoT device according to some embodiments of the present disclosure.

FIG. 7 is a block diagram of an IoT device according to some embodiments of the present disclosure, the IoT device may be configured to implement the authentication method according to the foregoing embodiments. As shown in FIG. 7, the IoT device includes a calculation module 11 and a sending module 12.

The calculation module 11 is configured to calculate account information corresponding to the IoT device according to the identifier and preset attribute information of the IoT device. The calculation module 11 may be a module in which the SDK is pre-programmed. The account information includes a username and a password.

In some embodiments, the attribute information of the IoT device includes the manufacturer information of the IoT device and the category corresponding to the IoT device.

Figure 8:
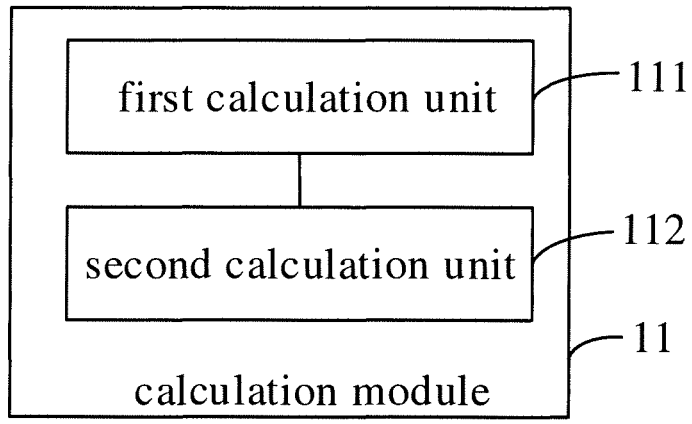
FIG. 8 is a block diagram illustrating a calculation module according to some embodiments of the present disclosure.

FIG. 8 is a block diagram illustrating a calculation module according to some embodiments of the present disclosure. As shown in FIG. 8, the calculation module 11 includes a first calculation unit 111 and a second calculation unit 112.

The first calculation unit 111 is configured to calculate the username according to the manufacturer information of the IoT device, the category corresponding to the IoT device and the identifier of the IoT device.

The second calculation unit 112 is configured to calculate the password according to the product key and the identifier of the IoT device. The product key may be calculated by the IoT device according to the manufacturer information and category corresponding to the IoT device.

Figure 9:
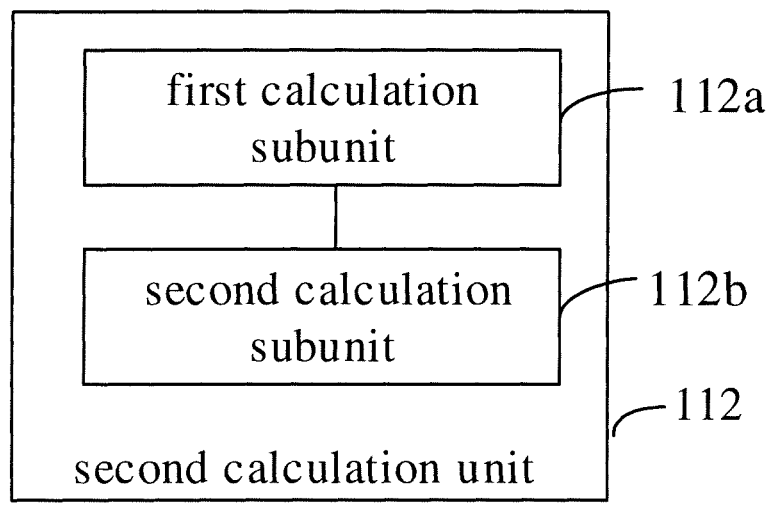
FIG. 9 is a block diagram illustrating a second calculation unit according to some embodiments of the present disclosure.

FIG. 9 is a block diagram of a second calculation unit according to some embodiments of the present disclosure. As shown in FIG. 9, the second calculation unit 112 includes a first calculation subunit 112a and a second calculation subunit 112b.

The first calculation subunit 112a is configured to calculate the session key according to the product key and the identifier of the IoT device. The second calculation subunit 112b is configured to encrypt and sign the identifier of the IoT device with the session key to obtain the password.

In other embodiments, the attribute information of the IoT device includes the manufacturer information of the IoT device, the category corresponding to the IoT device, and the product key. The product key may be calculated by the cloud server according to the manufacturer information and the category corresponding to the IoT device. The calculation module 11 includes the first calculation unit 111 and the second calculation unit 112, and the second calculation unit 112 also includes the first calculation subunit 112a and the second calculation subunit 112b.

The sending module 12 is configured to send the account information generated by the calculation module 11 to the cloud server for the cloud server to perform identity authentication on the IoT device according to the account information.

For descriptions of implementation details and technical effects of each module, unit, and subunit of the IoT device, reference may be made to the description of the embodiments of the authentication method, and details will not be described herein again.

In the present disclosure, the IoT device and the authentication method thereof may be applied to an on-board diagnostic (OBD) system, the IoT device may be a OBD terminal, and the cloud server may be a server for remote vehicle diagnoses.

Figure 10:
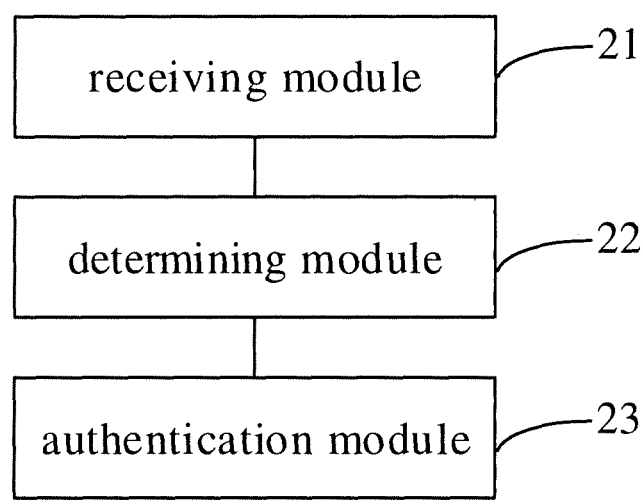
FIG. 10 is a block diagram of a cloud server according to some embodiments of the present disclosure.

FIG. 10 is a block diagram of a cloud server according to some embodiments of the present disclosure. As shown in FIG. 10, the cloud server may be configured to implement the authentication method according to the foregoing embodiments. The cloud server includes a receiving module 21, a determining module 22 and an authentication module 23.

The receiving module 21 is configured to receive the account information sent by the IoT device, the account information is calculated by the IoT device according to the identifier and the preset attribute information of the IoT device. The account information includes the username and the password.

The determining module 22 is configured to determine whether there is trusted account information matching the account information in the trusted list. Each trusted account information in the trusted list is calculated according to the identifier and the attribute information of the IoT device reported by the manufacturer of the IoT device.

In some embodiments, the attribute information of the IoT device includes the manufacturer information of the IoT device and the category corresponding to the IoT device. The trusted account information includes the trusted username and the trusted password.

Figure 11:
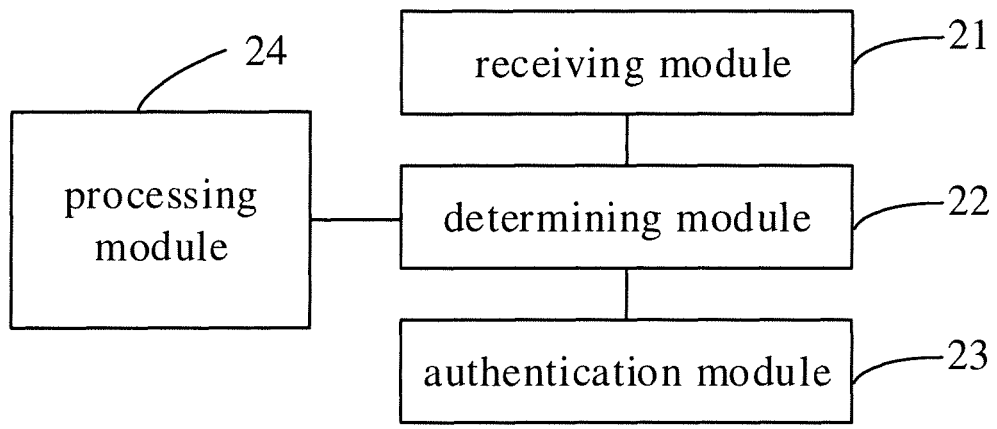
FIG. 11 is a block diagram of a cloud server according to some embodiments of the present disclosure.

FIG. 11 is a block diagram of a cloud server according to some other embodiments of the present disclosure. As shown in FIG. 11, the cloud server further includes a processing module 24 for calculating the trusted account information.

Figure 12:
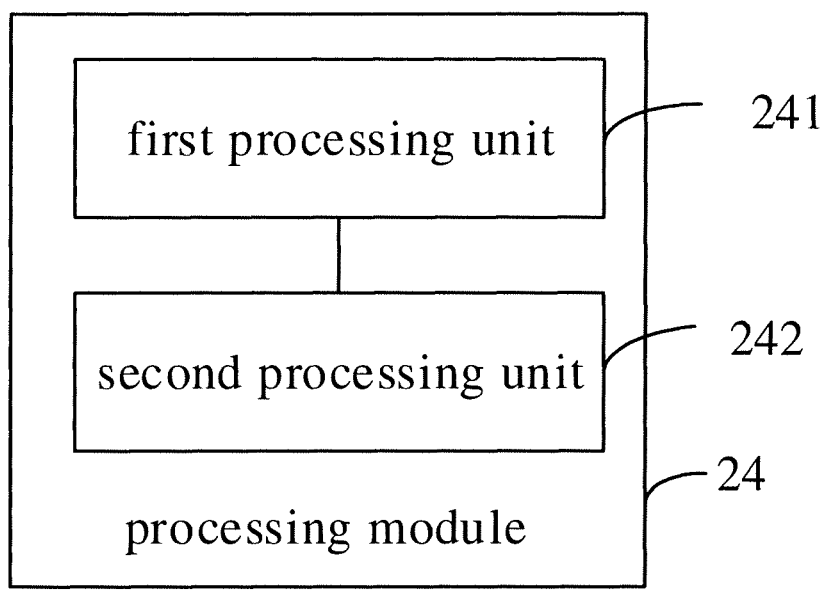
FIG. 12 is a block diagram illustrating a processing module according to some embodiments of the present disclosure.

FIG. 12 is a block diagram of a processing module according to some embodiments of the present disclosure. As shown in FIG. 12, the processing module 24 includes a first processing unit 241 and a second processing unit 242.

The first processing unit 241 is configured to calculate the trusted username according to the manufacturer information of the IoT device, the category corresponding to the IoT device and the identifier of the IoT device reported by the manufacturer of the IoT device.

The second processing unit 242 is configured to calculate the trusted password according to the product key and the identifier of the IoT device reported by the manufacturer of the IoT device. The product key is calculated according to the identifier of the IoT device and the category corresponding to the IoT device reported by the manufacturer of the IoT device.

Figure 13:
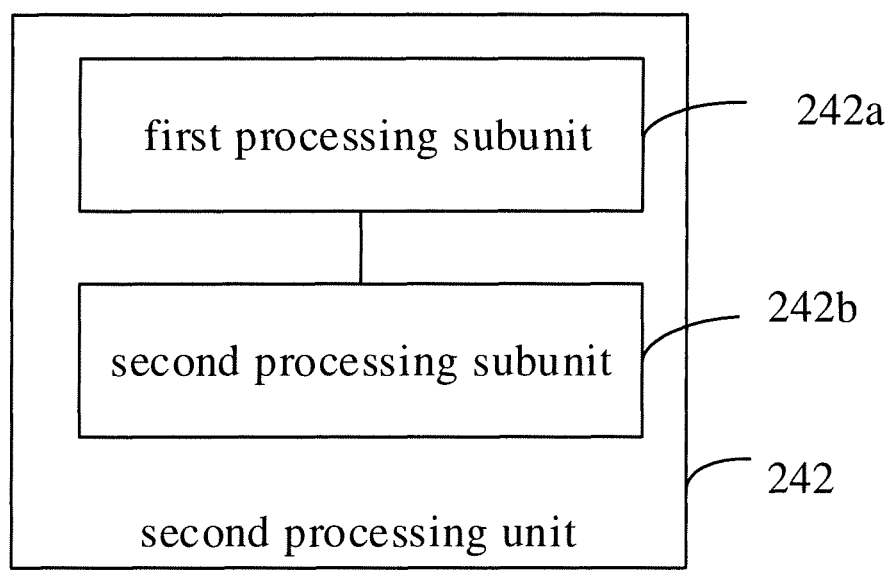
FIG. 13 is a block diagram illustrating a second processing unit according to some embodiments of the present disclosure.

FIG. 13 is a block diagram of a second processing unit according to some embodiments of the present disclosure. As shown in FIG. 13, the second processing unit 242 includes a first processing subunit 242a and a second processing subunit 242b.

The first processing subunit 242a is configured to calculate the session key according to the identifier of the IoT device reported by the manufacturer of the IoT device and the product key. The second processing subunit 242b is configured to encrypt and sign the identifier of the IoT device with the session key to obtain the trusted password.

The authentication module 23 is configured to determine that the IoT device passes the authentication when there is the trusted account information matching the account information in the trusted list, and determine that the IoT device does not pass the authentication when there is no trusted account information matching the account information in the trusted list.

For descriptions of implementation details and technical effects of each module, unit and subunit of the cloud server module, reference may be made to the description of the embodiments of the authentication method, and details will not be described herein again.

Embodiments of the present disclosure further provide a processing device, including: one or more processors, and a storage device having one or more programs stored thereon. When the one or more programs are executed by the one or more processors, the one or more processors are configured to implement an authentication method as described above.

The processing device may be a server or a terminal device.

Embodiments of the present disclosure further provide a computer readable medium having a computer program stored thereon, when the computer program is executed by a processor, the computer program implements an authentication method as described above.

Those skilled in the art can understand that all or some steps, systems and functional modules/units in the device disclosed in the method disclosed above may be implemented as software, firmware, hardware and appropriate combinations thereof. In a hardware implementation, the division between the functional modules/units mentioned above does not necessarily correspond to the division of physical components. For example, one physical component may have different functions, or one function or step may be executed by several physical components cooperatively. Some or all physical components may be implemented as software executed by a processor, such as a central processing unit and a digital signal processor, or a microprocessor, or implemented as hardware, or implemented as an integrated circuit, such as an application-specific integrated circuit. Such software may be distributed on a computer readable medium, which may include a computer storage medium (or a non-transitory medium) and a communication medium (or a transitory medium). As is known to those skilled in the art, the term computer storage medium includes a volatile, non-volatile, removable or non-removable medium implemented in any method or technology used to store information (such as computer readable instructions, data structures, program modules or other data). The computer storage medium includes, but is not limited to, RAM, ROM, EEPROM, a flash memory or other technologies of a storage device, CD-ROM, a digital versatile disk (DVD) or other optical disk storage devices, a magnetic cartridge, a magnetic tape, a disk storage device or other magnetic storage devices, or any other medium used to store desired information and can be accessed by a computer. In addition, it is well known to those skilled in the art that the communication medium typically contains computer readable instructions, data structures, program modules, or other data in a modulated data signal such as a carrier wave or other transmission mechanisms, and may include any information delivery medium.

Example embodiments have been disclosed herein, and although specific terms are adopted, the terms are used only and should only be interpreted as a general illustrative meaning, and are not used for limiting purposes. In some embodiments, it will be apparent to those skilled in the art that, unless explicitly stated otherwise, features, characteristics and/or elements described in combination with specific embodiments may be used separately, or in combination with features, characteristics and/or elements described in combination with other embodiments. Accordingly, it will be understood by those skilled in the art that various changes in forms and details may be made without departing from the scope of the present disclosure as set forth in the attached claims.

What is claimed is:

1. An authentication method for an IoT (Internet of Things) device, comprising:
    calculating account information corresponding to the IoT device according to an identifier and attribute information of the IoT device, wherein the attribute information of the IoT device comprises manufacturer information corresponding to the IoT device and a category of the IoT device, the account information comprises a username and a password; and
    sending the account information to a cloud server, to cause the cloud server to perform identity authentication on the IoT device according to the account information;
    calculating the account information corresponding to the IoT device comprises:
    calculating a session key by diversifying a product key and the identifier of the IoT device, wherein the product key is generated by intercepting and splicing the manufacturer information and the category of the IoT device; and
    encrypting and signing the identifier of the IoT device with the session key to obtain the password.

2. The authentication method according to claim 1, wherein calculating the account information corresponding to the IoT device further comprises: calculating the username according to the manufacturer information, the category and the identifier of the IoT device;
    wherein the product key is calculated by the IoT device.

3. The authentication method according to claim 1, wherein the attribute information of the IoT device further comprises a product key; and the product key is calculated by a cloud server;
    wherein calculating the account information corresponding to the IoT device further comprises: calculating the username according to the manufacturer information, the category and the identifier of the IoT device.

4. An authentication method for an IoT device, comprising:
    receiving account information sent by the IoT device, wherein the account information is calculated by the IoT device according to an identifier and preset attribute information of the IoT device, wherein the attribute information of the IoT device comprises manufacturer information corresponding to the IoT device and a category of the IoT device, the account information comprises a username and a password; and
    determining whether there is trusted account information matching the account information in a trusted list;
    determining that the IoT device passes authentication, in response to determining that there is the trusted account information matching the account information in the trusted list; and
    determining that the IoT device does not pass the authentication, in response to determining that there is no trusted account information matching the account information in the trusted list,
    wherein each trusted account information in the trusted list is calculated according to the identifier and the preset attribute information of the IoT device reported by a manufacturer of the IoT device;
    wherein the account information is calculated by acts of: calculating a first session key by diversifying a product key and the identifier of the IoT device, wherein the product key is generated by intercepting and splicing the manufacturer information and the category of the IoT device; and encrypting and signing the identifier of the IoT device with the first session key to obtain the password.

5. The authentication method according to claim 4, wherein the trusted account information comprises: a trusted username and a trusted password;
    wherein the trusted account information is obtained by acts of:

calculating the trusted username according to manufacturer information, a category and an identifier of the IoT device reported by the manufacturer of the IoT device; and calculating the trusted password according to the product key and the identifier of the IoT device reported by the manufacturer of the IoT device.

6. The authentication method according to claim 5, wherein calculating the trusted password according to the product key and the identifier of the IoT device reported by the manufacturer of the IoT device comprises:

calculating a second session key according to the identifier of the IoT device reported by the manufacturer of the IoT device and the product key; and encrypting and signing the identifier of the IoT device with the second session key to obtain the trusted password.

7. An IoT (Internet of Things) device, comprising:

one or more processors; and a storage device having one or more programs stored thereon, wherein when the one or more programs are executed by the one or more processors, the one or more processors are configured to:

calculate account information corresponding to the IoT device according to an identifier of the IoT device and preset attribute information of the IoT device, wherein the attribute information of the IoT device comprises manufacturer information corresponding to the IoT device and a category of the IoT device, the account information comprises a username and a password; and send the account information to a cloud server, to cause the cloud server to perform identity authentication on the IoT device according to the account information;

calculating the account information corresponding to the IoT device comprises:

calculating a session key by diversifying a product key and the identifier of the IoT device, wherein the product key is generated by intercepting and splicing the manufacturer information and the category of the IoT device; and encrypting and signing the identifier of the IoT device with the session key to obtain the password.

8. The IoT device according to claim 7, wherein the one or more processors are further configured to: calculate the username according to the manufacturer information, the category and the identifier of the IoT device;

wherein the product key is calculated by the IoT device.

9. The IoT device according to claim 7, wherein the attribute information of the IoT device further comprises a product key; and the product key is calculated by a cloud server;

the one or more processors are further configured to: calculate the username according to the manufacturer information, the category and the identifier of the IoT device.

* * * * *